Dec. 8, 1953     D. H. KEISER, JR     2,661,534
SHEARING ACTION DEVICE

Filed July 14, 1950     4 Sheets-Sheet 1

INVENTOR:
David Howard Keiser, Jr.,
BY
Alfred E. Ockinger

Dec. 8, 1953 D. H. KEISER, JR 2,661,534
SHEARING ACTION DEVICE
Filed July 14, 1950 4 Sheets-Sheet 2
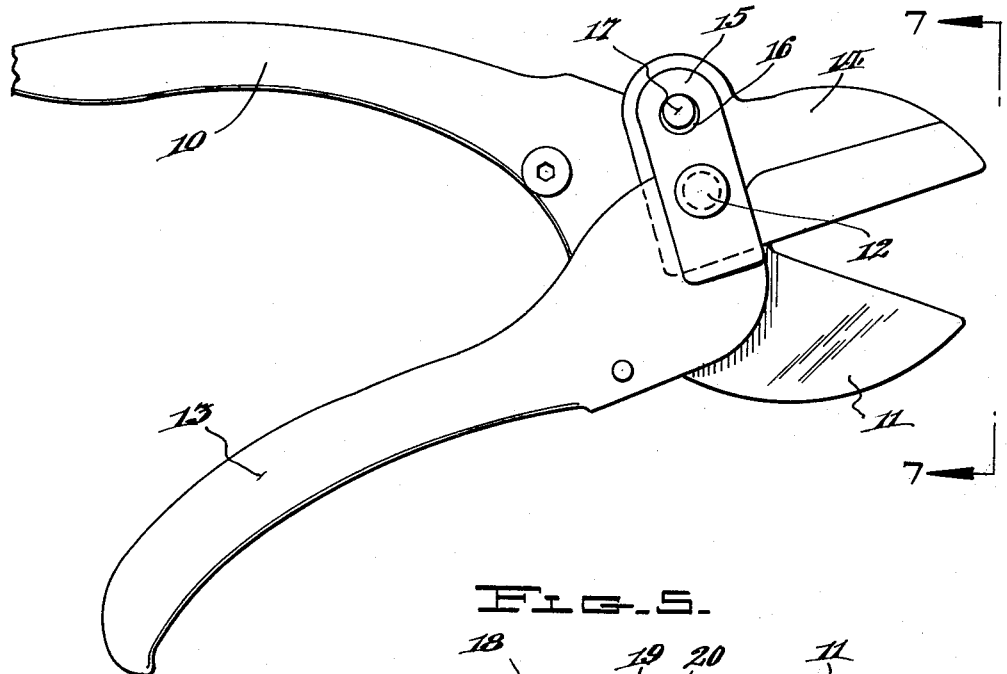
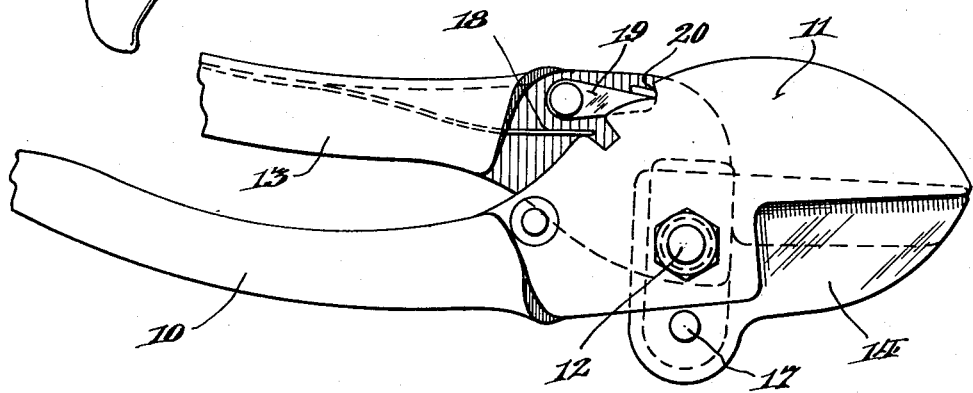
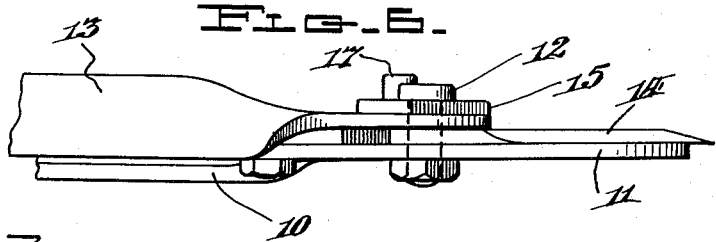
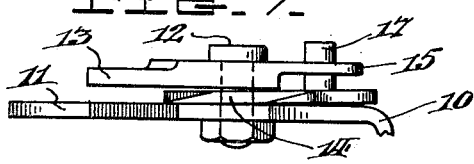
INVENTOR:
David Howard Keiser, Jr.,
BY
Alfred E. Pielinger Dec. 8, 1953     D. H. KEISER, JR     2,661,534
SHEARING ACTION DEVICE
Filed July 14, 1950     4 Sheets-Sheet 3
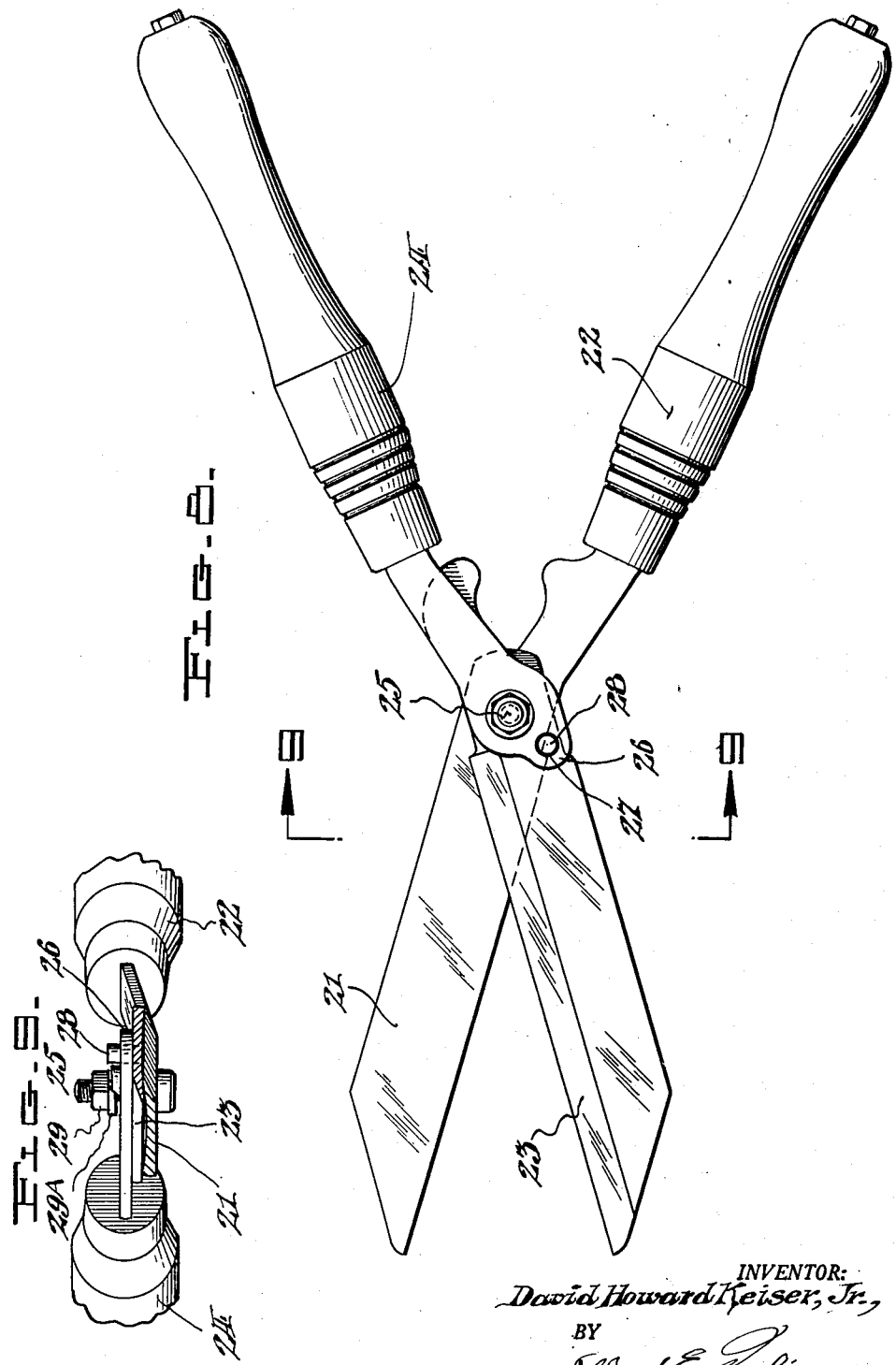
INVENTOR:
David Howard Keiser, Jr.,
BY
Alfred E. Tschinger Dec. 8, 1953 D. H. KEISER, JR 2,661,534
SHEARING ACTION DEVICE
Filed July 14, 1950 4 Sheets-Sheet 4
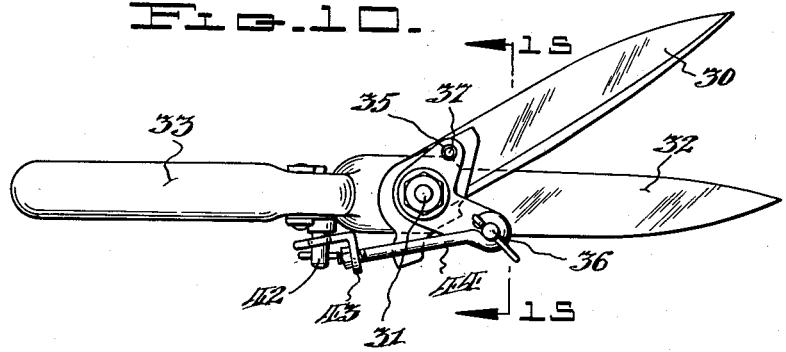
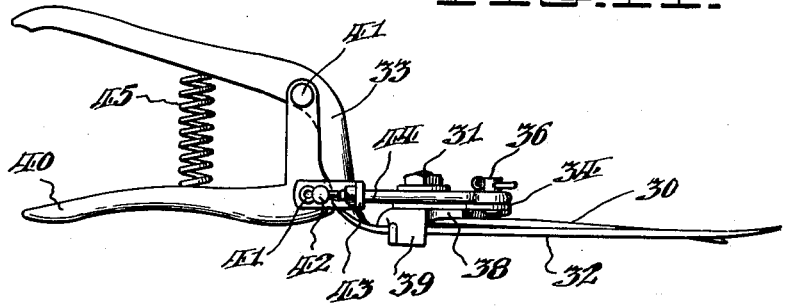
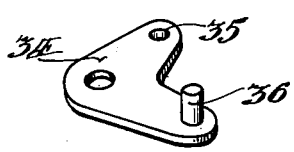
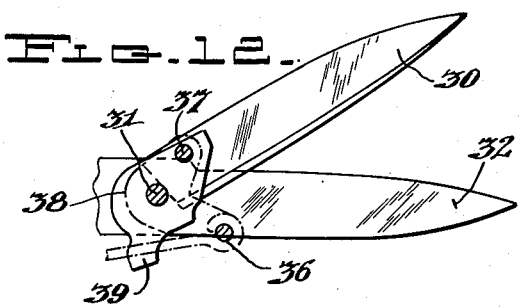
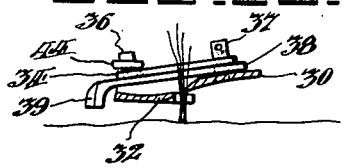
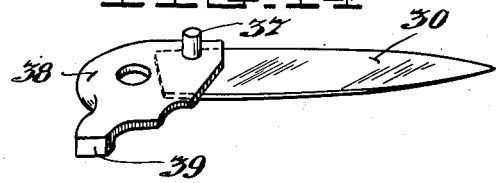
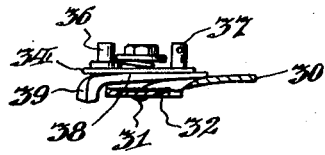
INVENTOR:
David Howard Keiser, Jr.,
BY
Alfred E. Dschinger Patented Dec. 8, 1953

2,661,534

UNITED STATES PATENT OFFICE 2,661,534

SHEARING ACTION DEVICE

David Howard Keiser, Jr., West Lawn, Pa.

Application July 14, 1950, Serial No. 173,784

5 Claims. (Cl. 30—248)

This invention relates to shearing devices of all types.

One object of my invention is to provide a novel device of the type indicated which has certain structural and functional features of advantage over the similar devices of the prior art.

Another object is to provide a novel shearing device adapted to effect movement of the blades thereof in such a manner that the operating pressure exerted thereon by hand, or otherwise, is translated into a compound movement of one of the blades relative to the other, i. e., sidewise movement and canting of one of the blades relative to the other, to such an extent as to automatically bring about tightening of the contact pressure between the cutting edges of the blades in direct correspondence with the shearing pressure exerted during working operation of the device.

Another object is to provide such a device having novel mounting means for one of the blades thereof arranged to effect a positive, joint canting and shearing movement of said blade during its operation relative to the other blade.

Another object is to provide novel operating means for one of the blades of such a device arranged to instantaneously effect a canting of this blade on the operation of the device.

A further object is to provide novel movement transmitting means for one of the blades of such a device in order to automatically effect the canting of this blade on the operation of the device.

Another object is to provide manually operated device of this type requiring minimum hand pressure for the operation thereof.

An additional object is to provide a highly efficient device of this type requiring none, or but very little spring pressure for holding the blades thereof in constant shearing contact.

Another object is to provide means whereby the blades of such a device are held in positive effective shearing contact during their entire shearing movement.

Another feature of the invention resides in the provision of novel mounting and operating means for one of the blades of such a device whereby canting of this blade is additionally effected by the material or object being severed during the cutting operation.

Another object is to provide novel mounting and operating means for the blades of such a device which will prevent their separation by the material or object during the cutting action of the device.

With these and other objects in view, which will become more apparent from the following detailed description of various practical and illustrative embodiments of my improvements shown in the accompanying drawings, my invention comprises the novel shearing devices, elements, features of construction and arrangement of parts in cooperative relationship, as more particularly defined and indicated by the hereto appended claims.

In the accompanying drawings:

Fig. 4 is a plan view of one side of a shearing device known as pruning shears, embodying my invention.

Fig. 5 is a plan view of the other side of the device illustrated in Figure 4, with the blades thereof in their closed position.

Fig. 6 is a side elevational view of the device illustrated in Figures 4 and 5.

Fig. 7 is an end view of the device depicted by Figs. 4, 5 and 6, as seen by looking in the direction of the arrows 7—7 in Figure 4.

Fig. 8 is a plan view of a shearing device, commonly referred to as hedge trimming shears, embodying my invention.

Fig. 9 is a cross sectional view of the device shown in Fig. 8, taken substantially as indicated by the arrows 9—9 of the latter.

Fig. 10 is a plan view of another shearing device, known as grass clipper shears, embodying my invention.

Fig. 11 is a side elevation of the device shown in Figure 10.

Fig. 12 is a detail plan view of the fixed and movable blade of the device shown in Figs. 10 and 11 and illustrates the pivotal connection between them.

Fig. 13 is a detail perspective view of one form of connecting member or element, used in transmitting the movement of the handle to the movable blade of the shearing device.

Fig. 14 is a detail perspective view of the movable blade of the shearing device shown in Figs. 10 and 11.

Fig. 15 is a cross sectional view taken substantially as indicated by the arrows 15—15 in Fig. 10.

Fig. 16 is a cross sectional view, similar to Fig. 15, but with blades of grass to be cut interposed between the blades of the shears in readiness to be clipped off thereby.

It will be helpful to an understanding of my invention to first briefly consider some of the more important aspects and features thereof, so that these may be kept in mind during the subsequent reading of the detailed description of the various practical and illustrative embodiments of my improvements shown in the accompanying drawings. Accordingly, it is noted that my invention may be embodied in any device having a shearing, cutting, clipping, or scissors action, in which two cutting blades are operated relative to each other so that their cutting edges cross each other.

In such devices the blade which is positively moved toward the other is the one which, according to my invention, automatically cants toward the other blade as soon as its shearing, cutting or clipping movement begins. For this purpose, the movable blade is loosely mounted or journaled, to permit the operating or driving member to cant, or tilt, the blade in cutting direction. The driving or operating member, in turn, is so formed and connected to the movable blade that actuation thereof will immediately cause the blade to cant or tilt as it is moved thereby to assure positive shearing action at all times. In this manner, positive canting action takes place throughout the entire shearing movement.

Ordinarily, the blades of the similar devices of the prior art, must be accurately set relative to each other and firmly held together at their pivotal connection in order to provide efficient shearing contact between their cutting edges. This is not required with the device of my invention because the shearing contact is secured by a cant of one of the blades relative to the other, as effected by its movement producing member. Furthermore, the tendency is to further cant the blade as soon as the object, or material to be cut, is engaged by the cutting edge of the blades during operation of my novel shearing device. This causes the movement producing member to increase the cant or tilt of the blade until the shearing function is completed and thereby increase the contact pressure between the cutting edges of the blades in direct proportion to the power exerted in performing the shearing operation by hand, or otherwise.

Figure 1:
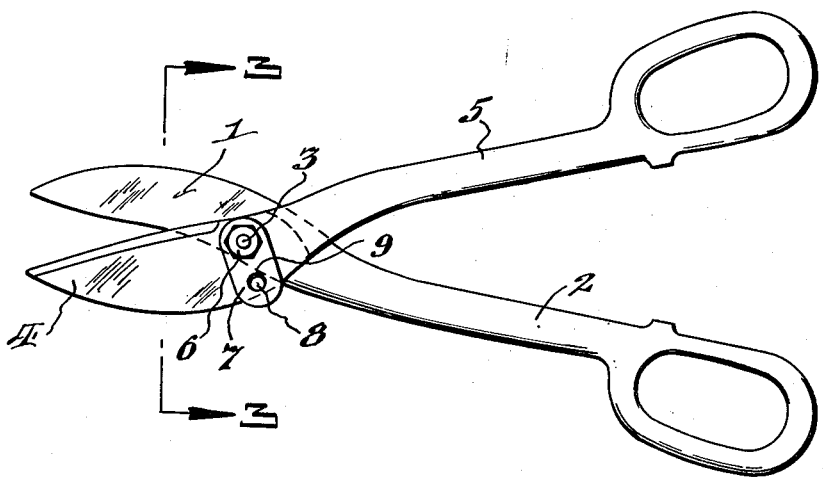
Figure 1 is a plan view of a shearing device, commonly referred to as tinsmith shears, embodying my invention.
Figure 2:
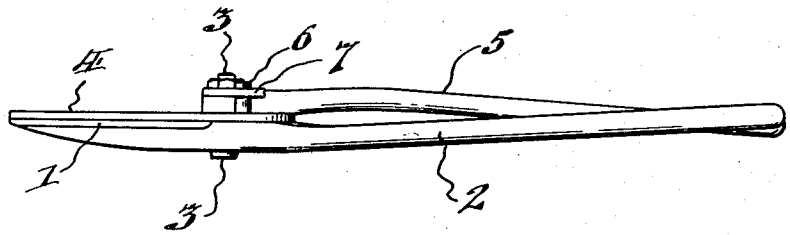
Fig. 2 is a side elevation of the shearing device shown in Figure 1.
Figure 3:
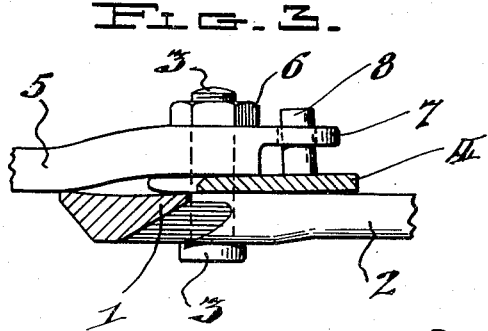
Fig. 3 is a cross sectional view, taken substantially on the line indicated by the arrows 3—3 in Figure 1.

Referring now to the drawings, Figs. 1, 2 and 3 illustrate one of the simplest shearing devices embodying my invention in the form of tin or sheet metal shears.

This form of shears comprises the blade 1 and handle 2, which are usually combined into a single or integral member so as to carry the pivot stud 3 at a point intermediate this handle and its blade. On the stud 3 is loosely pivoted the blade 4 and on top of this blade is journaled the handle 5. A nut 6 threaded on the stud 3 serves to hold these members together so that handle 5 can be readily moved relative to handle 2 and operate blade 4 by means of the movement transmitting connection which includes the arm 7, carried by the handle 5, and the stud 8 carried by the blade 4.

The stud 8 is slightly inclined on the blade 4 as illustrated in Figure 3 and loosely engages into the hole 9 provided in the arm 7. The latter is spaced from the blade 4 and thus contacts the stud 8 near its upper free end so that movement of the arm 7 by its handle 5 will not only cause the blade 4 to swing on the pivot stud 3 but also causes the activating force of the handle 5 to be directed against the blade 4 in pushing relation to the cutting edge thereof so as to slightly tilt or cant the blade in the space provided for this purpose between the combined blade 1 and handle 2 at the bottom, and the handle 5 at the top of blade 4 as illustrated in Figure 3. Movement of the handle 5 relative to the handle 2 will thus cause shearing movement of the blade 4 relative to the blade 2 and at the same time effect a positive cant of the blade 4 relative to the blade 2 to bring the cutting edge of both blades into intimate shearing contact and keep them in such contact over the entire movement of the blade 4 during which its cutting edge crosses the cutting edge of the blade 2.

In Figures 4 to 7 inclusive I have illustrated a pair of pruning shears embodying my invention. In these shears the handle 10 and blade 11 are integrally formed as one member and carry the pivot stud 12 for the handle 13 and blade 14 to swing thereon. The handle 13 carries the arm 15 which is spacedly arranged above the blade 14 and is provided with the hole 16 for engagement by the stud 17 carried by the blade 14. Sufficient space is provided between the top of handle 10 and bottom of handle 13 as illustrated in Figure 7 to permit a slight rocking movement of the blade 14 on the pivot stud 12 to thus effect a cant of the blade 14 toward the blade 11 whenever movement of the handle 13 is transmitted through the arm 15 and stud 17 to the blade 14 for shearing purposes.

When being operated, the two blades of the shears are normally held open by means of the spring 18 as illustrated in Figure 4, and when it is desired to close the shears and keep it closed a latch 19, carried by the handle 13, is made to engage the notch 20 provided in the back of the blade 11 as illustrated in Figure 5.

In Figures 8 and 9 my invention is shown embodied in hedge shears which comprise the blade 21 with its handle 22 fixedly attached thereto and the blade 23 with its handle 24 loosely connected thereto. As in the form of shears previously described, a pivot stud 25 is carried by the combined blade 21 and handle 22 and on this stud are pivotally mounted the blade 23 and the handle 24. The handle 24 has a short extension 26 which is provided with the hole 27 and the blade 23 carries the stud 28 for engagement into the hole 27 to complete the connection between the blade 23 and the handle 24 for joint and free pivotal movement on the stud 25. Sufficient clearance is provided in the bearings of the handle 24 and blade 23 to permit these members to slightly cant on the pivot stud 25. Normally, however, the blade 23 and handle 24 are yieldingly held against the inner end of the stationary blade 21 by means of the spring 28A and the nut 29 which is threaded to the stud 25. This yielding pressure is not great enough to firmly hold the blades 21 and 23 in a predetermined set position relative to each other but is calculated to yield whenever the handle 24 is moved to operate the blade 23 through its connection provided by the extension 26 and the stud 25. The movement of the handle through this connection as in the case of the shears above described causes the blade 23 to simultaneously cant or tilt during its shearing movement.

The embodiment of my invention in grass shears is illustrated in Figures 10 to 16 inclusive.

In these shears the movable blade 30 is loosely pivoted on the stud 31 which in turn is supported at a point intermediate this blade and its handle 33. Also pivoted on the stud 31 on top of the blade 30 is the movement transmitting plate 34 which is substantially bellcrank shaped and is provided near one of its free ends with the hole 35 and near the other free end with the stud 36. A stud 37 carried by the movable blade 30 is adapted to project through the hole 35 in the plate 34 to provide the driving connection therebetween. In addition the movable blade 30 has suitably attached thereto the bearing member 38 with which it is pivoted to the pivot stud 31. The bearing member 38 carries the lug 39, which serves as a movement limiting stop for the movable blade 30, in one direction on its contact with the back of the stationary blade 32.

A handle 40 for the operation of the shears is pivoted to the fixed handle 33 at 41 and its movement is transmitted to the stud 36 of the movement transmitting plate 34 by the stud 42, angle bracket 43 and link 44. An expansion spring 45 mounted between the fixed and movable handles normally separates the handles to a point where the stop 39 of the movable blade 30 arrests any further opening movement of the blade 30 and thus holds both blades in a predetermined shearing position relative to each other.

As in the other types of shears heretofore described in connection with my invention, the pivotal mounting of the movable blade 30 and the movement transmitting plate 34 on the pivot stud 31 has sufficient clearance to permit the movable blade 30 to cant relative to the fixed blade 30 whenever pressure is applied to the stud 37 by the movement transmitting plate on the operation of the handle 40.

It will be apparent from the above description and the drawings that the contact pressure between the cutting edges of the blades is proportionate to the determined canting of one of the blades. Therefore, to obtain a determined canting, the movable blade is initially regulated, or set, to effect the desired contact pressure between the cutting edges of both blades. For example, referring to the device as illustrated in Figure 7, the canting effect can be increased or decreased by initially establishing a higher or lower contact of the operating arm 15 on the stud 17.

While I have shown and described several practical and illustrative embodiments of my novel shearing devices, it is to be understood that various changes and modifications thereof are possible without departing from the scope of my invention which is more particularly indicated by the hereto appended claims.

I claim:

1. Shears of the character described comprising, an integral handle and blade unit, a pivot stud intermediate the ends of said unit, a second handle pivoted on said pivot stud, a cutting blade loosely pivoted on said pivot stud between said handle and blade unit and said second handle, an extension member on said second handle having a portion thereof positioned above and substantially adjacent to the rear edge of said loosely pivoted cutting blade, and means establishing a loose connection between said loosely pivoted cutting blade and said extension member portion so as to effect tilted pushing movement of the loosely pivoted cutting blade about the pivot stud during cutting operation of the shears.

2. Shears of the character described comprising, an integral handle and blade unit, a pivot stud intermediate the ends of said unit, a second handle pivoted on said pivot stud, a cutting blade loosely pivoted on said pivot stud, lever means pivoted on said pivot stud which lever means has a portion thereof positioned above and near the rear edge of said loosely pivoted cutting blade, means operatively connecting said second handle and lever means, and means establishing a loose connection between said loosely pivoted cutting blade and lever means portion so as to effect tilted pushing movement of the loosely pivoted cutting blade about the pivot stud during the cutting operation of the shears.

3. Shears of the character described comprising, an integral handle and blade unit, a pivot stud intermediate the ends of said unit, lever means pivoted on said pivot stud above the blade of said unit, a cutting blade loosely pivoted on said pivot stud between said handle and blade unit and said lever means, a connecting stud projecting from said cutting blade and loosely engaging said lever means in spaced relation to said cutting blade to establish a rocking connection on said pivot stud of said loosely pivoted blade by said lever means, and a second handle for operating said lever means.

4. Shears in accordance with claim 3, in which said connecting stud is inclined toward the cutting edge of said loosely pivoted cutting blade.

5. Shears of the character described comprising, an integral handle and cutting blade unit, a pivot stud intermediate the ends of said unit, a second handle pivotally mounted on said unit, a second cutting blade loosely pivoted on said pivot stud, and means establishing a loose connection between said second handle and second cutting blade above the cutting edge of the latter and adjacent the rear edge of said second cutting blade so that the second cutting blade will be pushed about the pivot stud in tilted relation to the blade of said unit during cutting operation of the shears.

DAVID HOWARD KEISER, Jr.

References Cited in the file of this patent

UNITED STATES PATENTS

| Number | Name | Date |
|---|---|---|
| 21,369 | Roome | Aug. 31, 1858 |
| 1,562,630 | Ginnell | Nov. 24, 1925 |
| 2,010,576 | Whyte | Aug. 6, 1935 |
| 2,033,216 | Whyte | Mar. 10, 1936 |
| 2,269,961 | Vincze | Jan. 13, 1942 |
| 2,281,977 | Keiser, Jr. | May 5, 1942 |
| 2,436,560 | Feather | Feb. 24, 1948 |
| 2,528,816 | Boyer | Nov. 7, 1950 |
| 2,560,673 | Vosen et al. | July 17, 1951 |